US007397026B2

(12) United States Patent
Dowell

(10) Patent No.: US 7,397,026 B2
(45) Date of Patent: Jul. 8, 2008

(54) EFFICIENT ELECTRON TRANSFER DISSOCIATION FOR MASS SPECTROMETRY

(75) Inventor: Jerry T Dowell, Carson City, NV (US)

(73) Assignee: Agilent Technologies, inc., Santa Clara, CA (US)

( * ) Notice: Subject to any disclaimer, the term of this patent is extended or adjusted under 35 U.S.C. 154(b) by 0 days.

(21) Appl. No.: 11/742,380

(22) Filed: Apr. 30, 2007

(65) Prior Publication Data

US 2007/0262252 A1 Nov. 15, 2007

Related U.S. Application Data

(63) Continuation-in-part of application No. 11/314,592, filed on Dec. 20, 2005.

(51) Int. Cl.
*B01D 59/44* (2006.01)
*H01J 49/00* (2006.01)

(52) U.S. Cl. ....................... 250/281; 250/282; 250/285; 250/288; 250/251; 250/292; 250/291; 250/492.3; 250/442.11; 250/400; 250/423 R; 435/6; 435/14; 435/15; 435/18; 436/93; 436/86; 436/94; 436/173; 702/1; 702/19; 702/20

(58) Field of Classification Search ................. 250/281, 250/282, 285, 251, 292, 288, 492.3, 442.11, 250/400, 291, 423 R; 435/6, 15, 18, 14; 436/93, 86, 94, 173; 702/1, 19, 20
See application file for complete search history.

(56) References Cited

U.S. PATENT DOCUMENTS

2005/0199804 A1 * 9/2005 Hunt et al. .................. 250/290

OTHER PUBLICATIONS

Syka, J.E.P., Coon, J.J., Schroeder, M.J., Shabanovitz, J., Hunt, D.F. "Peptide and protein sequence analysis by electron transfer dissociation mass spectrometry" PNAS vol. 101 No. 26, pp. 9528 to 9533, Jun. 29, 2004.*

* cited by examiner

*Primary Examiner*—Jack I. Berman
*Assistant Examiner*—Meenakshi S Sahu

(57) ABSTRACT

The present invention relates to, inter alia, methods and apparatuses for electron transfer dissociation (ETD) that vary the internal energy of precursor ions for ETD. The methods and apparatuses are particularly useful in mass spectrometry.

19 Claims, 6 Drawing Sheets

EFFICIENT ELECTRON TRANSFER DISSOCIATION FOR MASS SPECTROMETRY

RELATED APPLICATIONS

This application is a continuation-in-part of U.S. patent application Ser. No. 11/314,592, filed Dec. 20, 2005, the disclosure of which is hereby incorporated by reference in its entirety.

BACKGROUND OF THE INVENTION

Electron capture dissociation (ECD) of multiply charged protein cations is a well established process and technique (see, e.g., Syka et al., 2004). In this method multiply protonated peptide or proteins are confined in the Penning trap of a Fourier transform ion cyclotron resonance (FTICR) mass spectrometer and exposed to electrons with near-thermal energies. Capture of an electron then takes place. The capture of a thermal electron by a protonated peptide is exothermic (~6 eV; 1 eV=$1.602\times10^{-19}$ J), and causes the peptide backbone to fragment by a nonergodic process (i.e., one that does not involve intramolecular vibrational energy redistribution). In addition, one or more protein cations can be neutralized with low energy electrons to cause specific cleavage of bonds to form c, z products, in contrast to b, y products formed by other techniques such as collisionally activated dissociation (CAD; also known as collision-induced dissociation, CID), infrared mulitphoton (IRMPD) and UV dissociation.

ECD has become the technique of choice using FTICR mass spectrometers. This is largely because the fragmentation occurs along peptide backbones in a sequence-independent manner, preserves posttranslational modifications and can be implemented on a millisecond time scale with precursor-to-product ion conversion efficiencies that approach 30%. Unfortunately, ECD in its most efficient form requires the precursor sample ions to be immersed in a dense population of near-thermal electrons. Emulating these conditions in instruments used for peptide or protein analysis that trap ions and use radio frequency (RF) electrostatic fields remains a significant technical challenge. For instance, thermal electrons, if introduced into the RF fields of RF 3D quadrupole ion trap (QIT), quadrupole time-of-flight or RF linear 2D quadrupole ion trap (QLT) instruments, maintain their thermal energies for only a fraction of a microsecond and are not trapped. In addition, the technique is difficult to implement in ion guides and ion traps. To date, proposals to circumvent this problem have been largely unsuccessful. Therefore, the technique remains exclusively useful with expensive MS instruments, such as FTICR mass spectrometers.

For the above described reasons, development of an ECD-like dissociation method for use with widely accessible and low-cost mass spectrometers, such as the QLT, would have obvious utility. Because storage of thermal electrons in RF ion containment fields seems problematic, scientists investigated the possibility of using anions as vehicles for delivering electrons to multiply charged peptide cations. It was determined that anions with sufficiently low electron affinities could function as suitable electron donors. Hence the technique of electron transfer dissociation (ETD) was developed (see, e.g., Syka et al., 2004). ETD in most cases is easier to implement on various mass spectrometers and results in similar advantages as ECD, without the added cost.

However, both ETD and ECD suffer from the problem that the precursor ions are cooled by supersonic expansion as they flow out of the ion source and the (internally) cold ions may exhibit low fragmentation efficiencies. While fragmentation quantities and patterns can be controlled to some extent by ion kinetic energies in the case of CID, fragmentation efficiencies and patterns tend to be fixed for ETD. It would be desirable to provide a method and apparatus that addresses these deficiencies.

DETAILED DESCRIPTION

Figure 1:
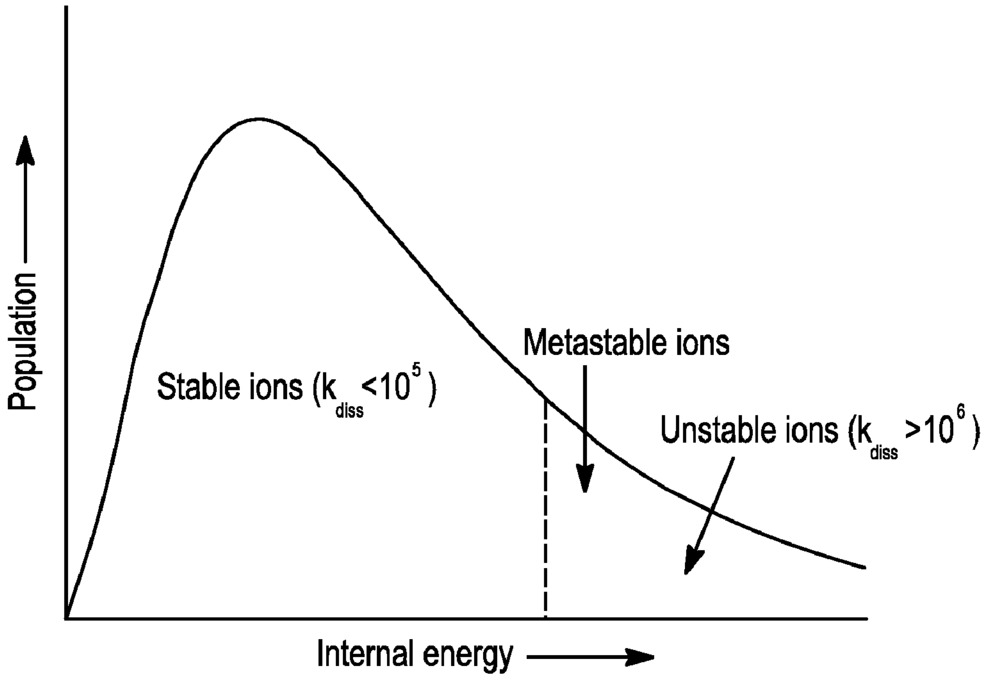
FIG. 1 shows a distribution of internal energy of precursor ions in a mass spectrometer system.

The present invention provides, inter alia, methods and devices for fragmenting analyte ions more efficiently with ETD by controlling the temperature of the analyte ions. Thus, some embodiments provide a method for fragmenting analyte ions by electron transfer dissociation, comprising establishing an internal temperature of the analyte ions using a heater and control system, and contacting the resulting analyte ions with anions in a reaction chamber for electron transfer dissociation. Some other embodiments provide an apparatus for fragmenting analyte ions using electron transfer dissociation, comprising a heater and control system for establishing an internal temperature of the analyte ions; and a reaction chamber for fragmenting the resulting analyte ions, wherein the fragmenting is performed by electron transfer dissociation. Mass spectrometer systems comprising such an apparatus are also provided.

The details of one or more embodiments of the invention are set forth in the accompanying drawings and the description below. Other features, objects, and advantages of the invention will be apparent from the description and drawings, and from the claims.

Prior to describing the invention in further detail, the terms used in this application are defined as follows unless otherwise indicated.

Definition

It should be noted that, as used in the specification and the appended claims, the singular forms “a,” “an” and “the” include plural referents unless the context clearly dictates otherwise. Thus, for example, reference to “a mass analyzer” includes combinations of mass analyzers, and reference to “an ion source” includes combinations of ion sources, and the like. The plural referents may or may not be identical. For instance, “a mass analyzer” includes combinations of mass analyzers, which may or may not be the same kind of mass analyzers.

A “mass spectrometer system” is a system that can be used to obtain the mass spectrum of a sample. A mass spectrometer system typically comprises an ion source, a mass analyzer, an ion detector and a data system. The ion source contains an ion generator which generates ions from the sample, the mass analyzer analyzes the mass/charge properties of the ions, the ion detector measures the abundances of the ions, and the data system processes and presents the data. Instrumental parameters such as voltages are usually set and controlled by a control system, which is often integrated with the data system. The mass spectrometer system may comprise additional components, such as ion guides or collision cells.

A “tandem mass spectrometer system” is a mass spectrometer system designed to perform multiple, sequential mass analysis steps. For example, a tandem mass spectrometer system may comprise a first-stage mass analyzer to select analyte ions of certain mass-to-charge ranges, a collision cell downstream from the mass filter to fragment the selected ions (precursor ions or parent ions) to produce daughter ions, and a second-stage mass analyzer downstream from the collision cell to analyze the mass-to-charge properties of the daughter ions.

As used herein, “downstream” indicates a later event or position in the direction of ion flow. Conversely, “upstream” indicates an earlier event or position in the direction of ion flow. Thus, if a second chamber is downstream from a first chamber, ions will enter the first chamber before entering the second chamber. The first and second chambers may be directly adjacent to each other, or separated by other components, such as ion guides or additional chambers.

As used herein, “adjacent” means near or next to. Two objects that are adjacent to each other may or may not physically contact each other, but they are usually connected, either directly or indirectly. The connection may be, for example, an electric connection, a fluid connection, or a mechanical connection that does not allow electricity or fluid to pass from one object to the other.

A “collision cell” is a chamber for ions (“precursor ions”) to collide with a neutral particle to result in fragmentation of the ions. In CID, the neutral particle is usually provided in the form of a collision gas, typically an inert, noble gas such as helium, argon or nitrogen, which does not interact chemically with the ions during collisions. When a precursor ion undergoes an inelastic collision with a neutral particle, part of the kinetic energy of the precursor ion is converted to internal energy, which, at low kinetic energies, usually causes excitation of vibrational states. However, the amount of kinetic energy that can be converted to internal energy is highly dependent on the relative masses of the ions and the neutral particle according to the formula:

$$E_{conv}=N/(m_p+N)\times KE \quad (1)$$

where $E_{conv}$ is the maximum energy available for conversion, KE is the kinetic energy of the precursor ion and N and mp represent the masses of the neutral particle and the precursor ion, respectively. From (1) it can be seen that the total energy available for conversion per collision is proportional to the kinetic energy of the ion and that conversion efficiency decreases as the mass of the precursor ion of interest increases.

It should be noted that in certain embodiments of the present invention, analyte ions are subject to a heater and control system in the presence of a collision gas. One purpose of the collision gas in these embodiments is to transmit heat to the analyte ions, and the ions/collision gas may or may not have sufficient kinetic energy for CID to occur. To induce CID, the ions and collision gas have to be accelerated (or “activated”) by using, for example, an RF or DC field.

The “internal temperature” of ions reflects the population distribution of internal energy levels of an ensemble of ions (for example, see FIG. 1).

Apparatuses and Methods

FIG. 1 shows a possible distribution of internal energies of analyte ions in a mass spectrometry system. As the figure illustrates, the ions at higher internal energies have a relatively higher dissociation rate, and are denoted as “unstable”. Thus, at low temperatures, only a small portion of the total population of precursor ions has high internal energies and dissociation rates, leading to low fragmentation rates.

Figure 2:
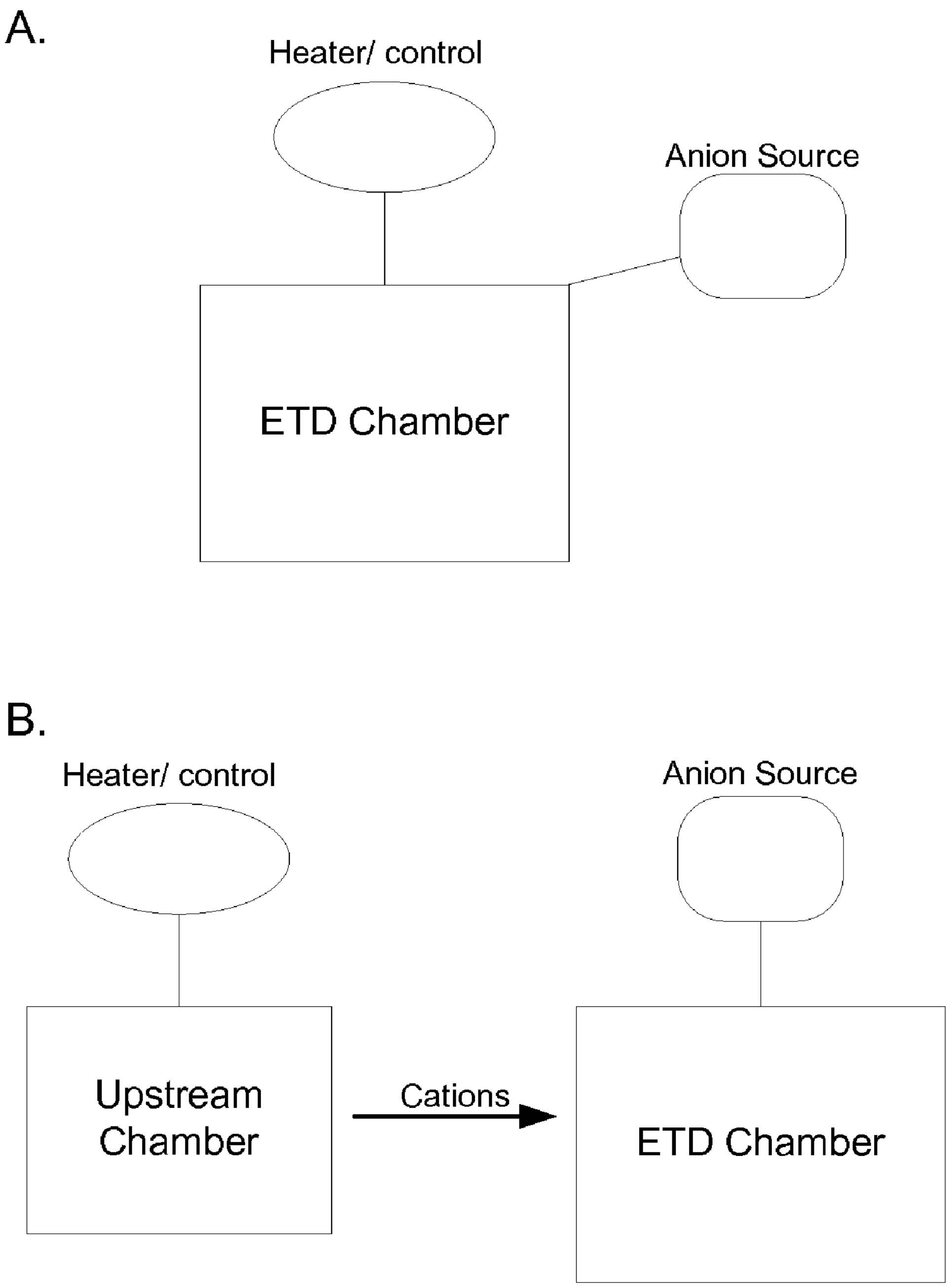
FIG. 2 is the schematic presentation of two embodiments of an apparatus that can be used to increase ETD efficiency.

The present invention provides methods and apparatuses to thermalize the ions, thus increasing the internal energy of the ions and shifting the energy distribution curve to the right, before electron transfer dissociation (ETD) takes place. Furthermore, by varying the extent of thermalization, the user can control the fragmentation pattern of the ions. FIG. 2 shows two exemplary apparatuses that can be used for this purpose. In FIG. 2A, an ETD chamber is connected to a heater and control system that controls the temperature of the ETD chamber. An anion source is also shown, which provides the anions required for the ETD process. FIG. 2B shows a configuration wherein a chamber upstream from the ETD chamber is subjected to the heater and control system, and the thermalized cations are fed into the ETD chamber for fragmentation.

The heater and control system can operate in any manner known in the art. Preferably, the system allows the user to choose or change the temperature or fragmentation pattern. In some embodiments, the temperature of the ions is controlled with a sensor/feedback mechanism, thus the user can set the temperature to a desired level, and the system automatically adjusts the temperature. Alternatively, the heater and control system may comprise a sensor to measure the temperature inside the chamber, and the user can adjust the heater power to achieve a desired temperature. In some embodiments, the temperature inside the chamber is between 0 and 500° C., such as about 0-50, 50-100, 100-150, 150-200, 200-250, 250-300, 300-350, 350-400, 400-450 or 450-500° C. Another option is for the user to adjust the heater power until the desired fragmentation pattern is obtained. With the heater and control system, it is possible to conduct multiple scans of the same analyte ions, each time with a different pre-fragmentation temperature, to obtain a series of mass spectral data that reflect increasing or decreasing levels of fragmentation (or increasing or decreasing temperature). The mass spectra obtained at different levels of fragmentation provide a great deal of information about the structures of the analyte ions.

The anion source can provide any anions suitable for ETD, such as anthracene, fluoanthene, fluorenon, and polyaromatic compounds of low electron affinity. These anions, and sources thereof (such as the negative chemical ionization source, NCI), are known in the art (see, e.g., Coon et al., 2004).

Figure 3:
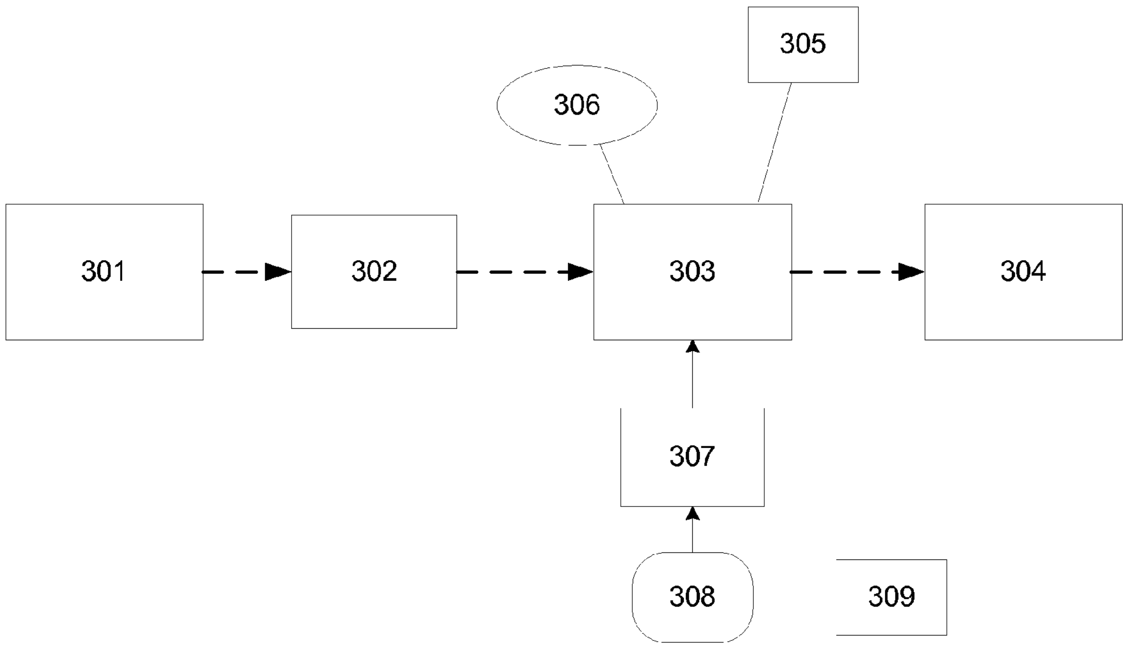
FIG. 3 shows some components of a mass spectrometer system of the present invention that comprises an ion trap. The dotted arrows indicate the path and direction of the ions produced by ion source 301 and analyzed in the mass spectrometer system.

The apparatuses for thermalizing analyte ions and ETD may form part of a mass spectrometer system. FIG. 3 shows some components of an embodiment that comprises an ion trap. The mass spectrometer system in FIG. 3 comprises a cation source 301 and ion optics 302, which sends ions into a linear or three-dimensional (3D) ion trap 303. The ion trap 303 is connected to a heater and control system 306 for ion thermalization. The ion trap 303 is also an ETD chamber, and is connected to an anion source 308, optionally through ion optics 307. A gas supply system 309 is connected to the anion source 308 to supply the gas(es) for production of anions. The system also comprises a supply of collision gas 305 that provides a collision gas (also called a buffer gas) to the ion trap 303. The collision gas is usually an inert, neutral gas, which causes the ions to reside more in the center of a 3D ion trap, improving resolution and sensitivity upon ejection. Here, since ion trap 303 is also an ETD chamber, the collision gas plays a further role of transmitting the heat generated by the heater and control system 306 to the ions.

The ion trap 303 sends ions into a detection system 304 for ion detection. Although not shown in this figure, the detection results are processed by a data analysis system. Also not shown, but known in the art, are vacuum systems (pumps, etc.) and control systems which are usually included in mass spectrometers.

In operation, cations produced by the cation source 302 are guided by the ion optics 302 to the ion trap 303. The ions are thermalized in the ion trap by the heater and control system 306 in conjunction with the collision gas, and at least some of the thermalized ions are fragmented by ETD. During the ETD, anions supplied by the anion source 308 transfer electrons to the ions, which is an exothermic process and causes the ions to fragment. The ions in the ion trap, either precursor ions or daughter ions, can be analyzed by the ion trap based on their mass-to-charge properties, usually by mass selective ejection from the trap. The ions are subsequently detected and measured by the detection system.

Figure 4:
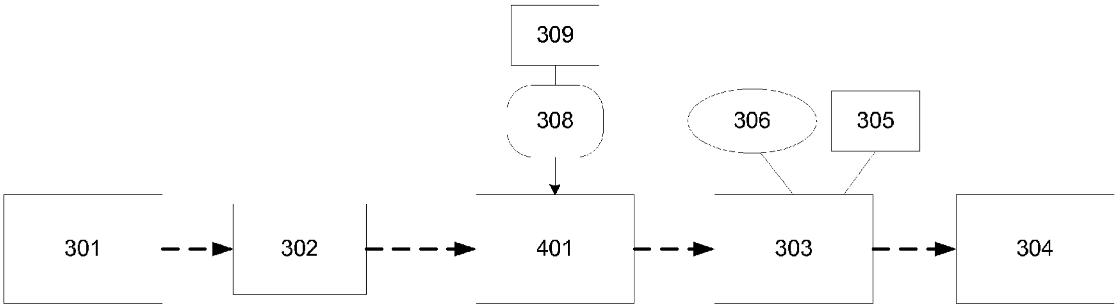
FIG. 4 shows some components of another mass spectrometer system of the present invention that comprises an ion trap. The dotted arrows indicate the path and direction of the ions produced by ion source 301 and analyzed in the mass spectrometer system.

The components may be arranged in different ways to achieve the same purpose. For example, FIG. 4 shows an embodiment in which the anion source 308 is adjacent to a switching optics system 401 that is upstream from the ion trap 303. The switching optics system 401 can selectively let anions into the ion trap 303. Accordingly, analyte ions produced by the cation source 301 and guided by the ion optics 302 may pass through the switching system 401, either simultaneously or sequentially with the anions, to the ion trap 303. In the sequential case, the analyte ions are thermalized in the ion trap 303 by contact with a collision gas and the heater and control system 306, and then the switching optics system 401 allows anions into the ion trap 303 for ETD to occur. The collision or buffer gas supply 305 provides the collision gas to the trap.

As described above, in certain embodiments, the ETD chamber (which comprises an ion trap in FIG. 3 and FIG. 4) may be separate from the chamber where thermalization takes place. Instead, the heater and control system is connected to a chamber upstream from the ETD chamber. In these embodiments, the upstream chamber would also receive a collision gas from a collision gas supply, which may be the collision gas supply 305 for the ion trap, or a separate one.

Figure 5:
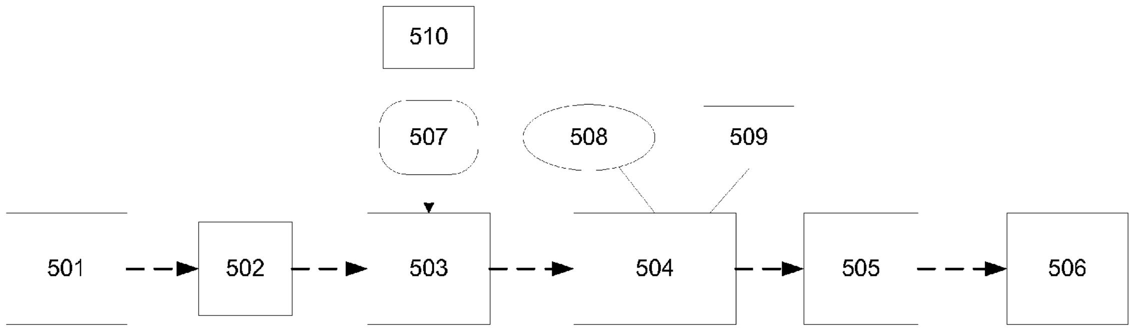
FIG. 5 shows some components of a tandem mass spectrometer system of the present invention. The dotted arrows indicate the path and direction of the ions produced by ion source 501 and analyzed in the mass spectrometer system.

The mass spectrometer system may be a tandem mass spectrometer system. For example, FIG. 5 shows some of the components in such a system. A cation source 501 produces ions, which are selected by a mass filter 502 according to the user's choice. The selected ions go to a switching optics system 503 that is adjacent an anion source 507 and gas supply system 510, like the switching optics system 401 in FIG. 4. An ETD chamber 504 is downstream from the switching optics system 503. The ETD chamber 504 is connected to a heater and control system 508, and a collision gas supply 509. The ETD chamber may also have ion guiding and/or trapping functions. For example, the ETD chamber may comprise an ion guide, such as a radio frequency ion guide with end electrodes set up for simultaneously trapping anions and cations (see, e.g., Syka et al., 2004). The ion guide may use DC potentials to provide axial ion containment. It may be segmented, with different segments capable of trapping ions of different polarities. The ion guide may also have axial fields that are varied during various portions of a trapping cycle. Downstream from the ETD chamber, the ions go to a mass analyzer or filter 505 and an ion detection system 506. If ETD chamber 504 comprises an ion guide or ion trap, the switching optics system 503 can be set up to merge the anions and cations, or to switch between them. On the other hand, if ETD chamber 504 does not have an ion trapping function, it is preferable that the switching optics system 503 let anions and cations into the ETD chamber 504 simultaneously so that the ETD reactions can occur while both species are in the chamber.

Figure 6:
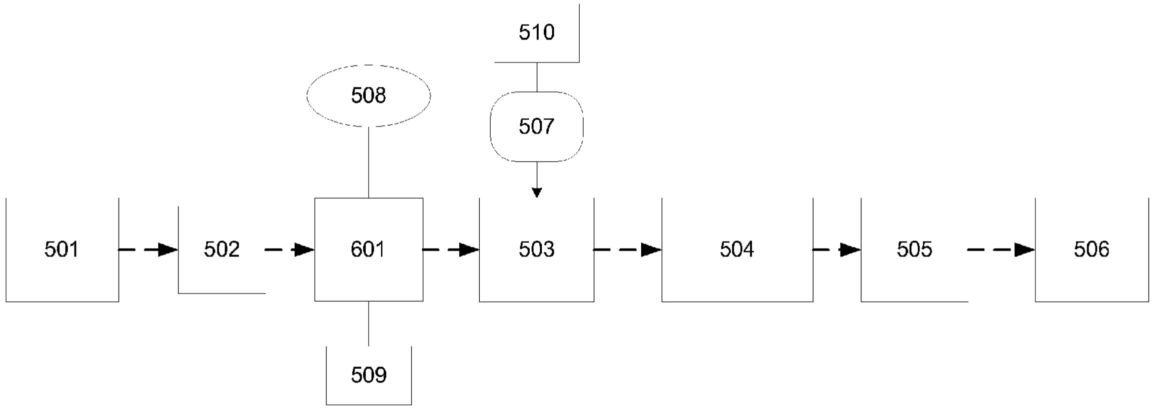
FIG. 6 shows some components of a tandem mass spectrometer system of the present invention that comprises a separate heating chamber. The dotted arrows indicate the path and direction of the ions produced by ion source 501 and analyzed in the mass spectrometer system.

FIG. 6 shows some components of a tandem mass spectrometer system having a separate heated chamber. Thus, ions travel from a cation source 501 to a mass filter 502 and a chamber 601, which is connected to a heater and control system 508 and a collision gas supply 509. Chamber 601 may also comprise an ion guide. The thermalized cations then pass through the switching optics system 503 downstream from anion source 507. Down stream from chamber 503 is an ETD chamber 504, which may also have ion guiding and trapping functions as described above. A mass analyzer/filter 505 and an ion detection system 506 are further downstream.

The ion source in the mass spectrometer system of the present invention may be any ion source that is capable of producing cations, such as electrospray (ES), atmospheric pressure chemical ionization (APCI), atmospheric pressure photoionization (APPI), matrix assisted laser desorption (MALDI), fast atom/ion bombardment (FAB), electron impact (EI), chemical ionization (CI) ion source, or any combination thereof. The ion source may be an atmospheric pressure (AP) or a non-atmospheric pressure ion source. The first stage mass analyzer (which usually functions as a selector of desired ions) in the tandem mass spectrometer system of the present invention may be any suitable mass analyzer or filter, for example, a quadrupole mass filter, linear ion trap, 3D ion trap, ion mobility device or a sector instrument (electric or magnetic). The second stage mass analyzer may be any suitable mass analyzer, such as time-of-flight, quadrupole mass filter, linear ion trap, 3D ion trap, orbitrap, fourier transform-ion cyclotron resonance (FTICR), a sector instrument, or combinations thereof. For instance, the tandem MS system may be a "QQQ" system comprising, sequentially, a quadrupole mass filter, an ETD chamber with ion guide, and a quadrupole mass analyzer. The tandem MS system may also be a "Q-TOF" system that comprises a quadrupole mass filter and a time-of-flight mass analyzer. In some embodiments, the MS system of the present invention comprises a mass analyzer or filter but not an ion trap, particularly not a 3D ion trap.

The mass spectrometer system may further comprise a gas chromatography column, a liquid chromatography column, and/or other sample separation or analysis devices.

LIST OF EXEMPLARY EMBODIMENTS

The present invention provides, for example, an apparatus for fragmenting analyte ions using electron transfer dissociation, comprising:

(a) a heater and control system for establishing an internal temperature of the analyte ions; and (b) a reaction chamber adjacent to the heater and control system for fragmenting the analyte ions of (a), wherein the fragmenting is performed by electron transfer dissociation.

In the apparatus, the heater and control system may establish the internal temperature of the analyte ions in a first chamber, which is upstream from the reaction chamber. Alternatively, the heater and control system may control the temperature of the reaction chamber and establish the internal temperature of the analyte ions in the reaction chamber. The reaction chamber and/or the upstream chamber may comprise an ion trap or an ion guide. In some embodiments, the reaction chamber or the upstream chamber may also be a collision cell.

Another aspect of the present invention provides a mass spectrometer system comprising the apparatus of the present invention. The mass spectrometer system may comprise any ion source that can generate cations, such as at least one ion source selected from the group consisting of ESI, APCI, MALDI, APPI, FAB, EI and CI ion sources.

In some embodiments, the mass spectrometer system may be a tandem mass spectrometer system. For example, the tandem mass spectrometer system may comprise:

(a) an ion source;

(b) a mass filter downstream from the ion source;

(c) the apparatus of the present invention downstream from the mass filter;

(d) a mass analyzer downstream from the apparatus; and (e) an ion detector downstream from the mass analyzer.

In some embodiments of the tandem mass spectrometer system, the mass filter is selected from the group consisting of quadrupole mass filters, linear ion traps and ion mobility devices, and/or the mass analyzer is selected from the group consisting of ion trap mass analyzers, time-of-flight mass analyzers, FTICR mass analyzers, and quadrupole mass analyzers.

Another aspect of the present invention provides a method for fragmenting analyte ions by electron transfer dissociation, comprising:

(a) establishing an internal temperature of the analyte ions using a heater and control system;

(b) contacting the analyte ions of (a) with anions in a reaction chamber for electron transfer dissociation.

In some embodiments, said establishing is performed in the reaction chamber. In some other embodiments, said establishing is performed in a first chamber upstream from the reaction chamber.

Yet another aspect of the present invention provides a method for analyzing analyte ions, comprising:

(a) selecting the masses of the analyte ions;

(b) fragmenting the analyte ions according to the method of claim 16 to result in daughter ions; and (c) analyzing the masses of the daughter ions.

ABBREVIATIONS

The abbreviations have the following meanings in this application. Abbreviations not defined have their generally accepted meanings.

° C.=degree Celsius
hr=hour
min=minute
sec=second
M=molar
mM=millimolar
μM=micromolar
nM=nanomolar
ml=milliliter
μl=microliter
nl=nanoliter
mg=milligram
μg=microgram
kV=kilovolt
CAD=collisionally activated dissociation
CID=collision induced dissociation
FTICR=Fourier transform ion cyclotron resonance
ECD=electron capture dissociation
ETD=electron transfer dissociation
LC=liquid chromatography
MS=mass spectrometer
MALDI=matrix assisted laser desorption ionization
ESI=electrospray ionization
APCI=atmospheric pressure chemical ionization
RF=radio frequency

REFERENECES

Coon et al., Anion dependence in the partitioning between proton and electron transfer in ion/ion reactions. Int. J. Mass Spec. 236:33-42 (2004).

Syka et al., Peptide and protein sequence analysis by electron transfer dissociation mass spectrometry. Proc Natl Acad Sci U S A. 101(26): 9528-9533 (2004).

All of the publications, patents and patent applications cited above or elsewhere in this application are herein incorporated by reference in their entirety to the same extent as if the disclosure of each individual publication, patent application or patent was specifically and individually indicated to be incorporated by reference in its entirety.

A number of embodiments of the invention have been described. Nevertheless, it will be understood that various modifications may be made without departing from the spirit and scope of the invention.

What is claimed is:

1. An apparatus for fragmenting analyte ions using electron transfer dissociation, comprising:

(a) a heater and control system for establishing an internal temperature of the analyte ions; and (b) a reaction chamber for fragmenting the analyte ions of (a), wherein the fragmenting is performed by electron transfer dissociation.

2. The apparatus of claim 1, wherein the heater and control system establish the internal temperature of the analyte ions in a first chamber, which is upstream from the reaction chamber.

3. The apparatus of claim 1, wherein the heater and control system control the temperature of the reaction chamber and establish the internal temperature of the analyte ions in the reaction chamber.

4. The apparatus of claim 1, wherein the reaction chamber comprises an ion trap.

5. A mass spectrometer system comprising the apparatus of claim 1.

6. The mass spectrometer system of claim 5, wherein the heater and control system establish the internal temperature of the analyte ions in a first chamber, which is upstream from the reaction chamber.

7. The mass spectrometer system of claim 5, wherein the heater and control system control the temperature of the reaction chamber and establish the internal temperature of the analyte ions in the reaction chamber.

8. The mass spectrometer system of claim 5, wherein the reaction chamber comprises an ion trap.

9. The mass spectrometer system of claim 5, wherein the reaction chamber comprises an ion guide.

10. The mass spectrometer system of claim 5, comprising at least one ion source selected from the group consisting of ESI, APCI, MALDI, APPI, FAB, EI and CI ion sources.

11. A tandem mass spectrometer system comprising the apparatus of claim 1.

12. The tandem mass spectrometer system of claim 11, wherein the heater and control system establish the internal temperature of the analyte ions in a first chamber, which is upstream from the reaction chamber.

13. The tandem mass spectrometer system of claim 11, wherein the heater and control system control the temperature of the reaction chamber and establish the internal temperature of the analyte ions in the reaction chamber.

14. The tandem mass spectrometer system of claim 11, comprising:

(a) an ion source;

(b) a mass filter downstream from the ion source;

(c) the apparatus downstream from the mass filter;

(d) a mass analyzer downstream from the apparatus; and (e) an ion detector downstream from the mass analyzer.

15. The tandem mass spectrometer system of claim 14, wherein the mass filter is selected from the group consisting of quadrupole mass filters, linear ion traps and ion mobility devices, and the mass analyzer is selected from the group consisting of ion trap mass analyzers, time-of-flight mass analyzers, FTICR mass analyzers, and quadrupole mass analyzers.

16. A method for fragmenting analyte ions by electron transfer dissociation, comprising:

(a) establishing an internal temperature of the analyte ions using a heater and control system;

(b) contacting the analyte ions of (a) with anions in a reaction chamber for electron transfer dissociation.

17. The method of claim 16, wherein said establishing is performed in the reaction chamber.

18. The method of claim 16, wherein said establishing is performed in a first chamber upstream from the reaction chamber.

19. A method for analyzing analyte ions, comprising:

(a) selecting the masses of the analyte ions;

(b) fragmenting the analyte ions according to the method of claim 16 to result in daughter ions; and (c) analyzing the masses of the daughter ions.

* * * * *